United States Patent [19]

Nakano et al.

[11] 4,391,130

[45] Jul. 5, 1983

[54] METHOD OF AND APPARATUS FOR COMMUNICATING THE OPERATING CONDITION OF AN INTERNAL COMBUSTION ENGINE

[75] Inventors: Jiro Nakano, Okazaki; Hironobu Ono, Toyota, both of Japan

[73] Assignee: Toyota Jidosha Kogyo Kabushiki Kaisha, Toyota, Japan

[21] Appl. No.: 303,493

[22] Filed: Sep. 18, 1981

[30] Foreign Application Priority Data

Sep. 25, 1980 [JP] Japan ............................ 55/132269

[51] Int. Cl.³ ........................................ G01M 15/00

[52] U.S. Cl. ................................ 73/117.3; 123/489; 364/551

[58] Field of Search ................ 73/117.3; 364/431.03, 364/551; 123/489

[56] References Cited

U.S. PATENT DOCUMENTS

| | | | |
|---|---|---|---|
| 4,252,098 | 2/1981 | Tomczak et al. | 123/489 X |
| 4,290,107 | 9/1981 | Suda et al. | 123/489 X |

*Primary Examiner*—Jerry W. Myracle
*Attorney, Agent, or Firm*—Cushman, Darby & Cushman

[57] ABSTRACT

A feedback operation check signal which indicates whether or not the feedback amount determined depending the output signal from the exhaust gas sensor to control the air-fuel ratio is within a predetermined range is fed to an information output terminal, when the throttle valve is in the idling position. On the other hand, when the throttle valve is not in the idling position, an electrical signal which is synchronized with the output signal from the exhaust gas sensor is fed to the same information output terminal.

14 Claims, 9 Drawing Figures

AIR FLOW SENSOR
COOLANT TEMPERATURE SENSOR
BATTERY
IDLE SWITCH
CRANK ANGLE SENSOR
EXHAUST GAS SENSOR
BUFFER
ANALOG MULTIPLEXER
A/D CONVERTER
SPEED SIGNAL-FORMING CIRCUIT
INTERRUPT REQUEST CIRCUIT
INTERRUPT LATCHING CIRCUIT
INPUT PORT
INPUT / OUTPUT PORT
ROM
RAM
CPU
+5V
22
31
33
27
25a
29
50
51
52
57
60
62
65
66
53
54
61
67
68
56
59
71
70
72
79
80
73

METHOD OF AND APPARATUS FOR COMMUNICATING THE OPERATING CONDITION OF AN INTERNAL COMBUSTION ENGINE

BACKGROUND OF THE INVENTION

The present invention relates to a method of communicating the operating conditions of an internal combustion engine.

Control systems are known in which a microcomputer is employed as a feedback control unit for controlling the ratio of the air-fuel mixture supplied to the engine. The feedback control unit receives data related to the concentration of a predetermined component in the exhaust gas by an exhaust gas sensor such as an oxygen concentration sensor ($O_2$ sensor), and produces a loop feedback signal depending upon an output signal from the $O_2$ sensor. The feedback control unit, then, corrects the ratio of the air-fuel mixture supplied to the engine depending upon the produced loop feedback signal to control the air-fuel ratio to a desired value.

The control system usually includes a specific output terminal for checking whether the loop feedback signal lies within a predetermined range or not, in order to adjust the feedback control unit. The control system is also equipped with another specific output terminal for an $O_2$ sensor check signal which is synchronized with the output signal from the $O_2$ sensor. The $O_2$ sensor check signal is used for checking the response performance of the $O_2$ sensor. Furthermore, the control system is sometimes equipped with further output terminals for diagnosing signals which communicate abnormal operations or malfunctions of the engine or of the elements constituting the control system to the mechanic when tuning the engine.

As mentioned above, since the conventional control system is equipped with many specific output terminals and many output buffers, one for each of the various check signals and each of the various diagnostic signals, the control system becomes complicated and expensive to manufacture.

SUMMARY OF THE INVENTION

It is, therefore, an object of and apparatus for the present invention to provide a method of communicating the operating condition of an internal combustion engine, whereby number of the information output terminals can be greatly reduced.

According to the present invention, an idling detection signal is generated which indicates whether a throttle valve of the engine is in the idling condition. In response to the idling detection signal, the loop feedback signal, which is produced by the air-fuel ratio feedback control system depending upon the output signal from an exhaust gas sensor, is monitored to determine whether it is within a predetermined range, and an electrical signal which indicates whether or not the loop feedback signal is within the predetermined range is fed to an information output terminal only when the throttle valve is in the idling position. In response to the idling detection signal, an electrical signal which is synchronized with the output signal from the exhaust gas sensor is fed to the information output terminal, when the throttle valve is not in the idling condition.

The above and other related objects and features of the present invention will be apparent from the description of the present invention set forth below, with reference to the accompanying drawings, as well as from the appended claims.

DETAILED DESCRIPTION OF THE PREFERRED EMBODIMENTS

Figure 1:
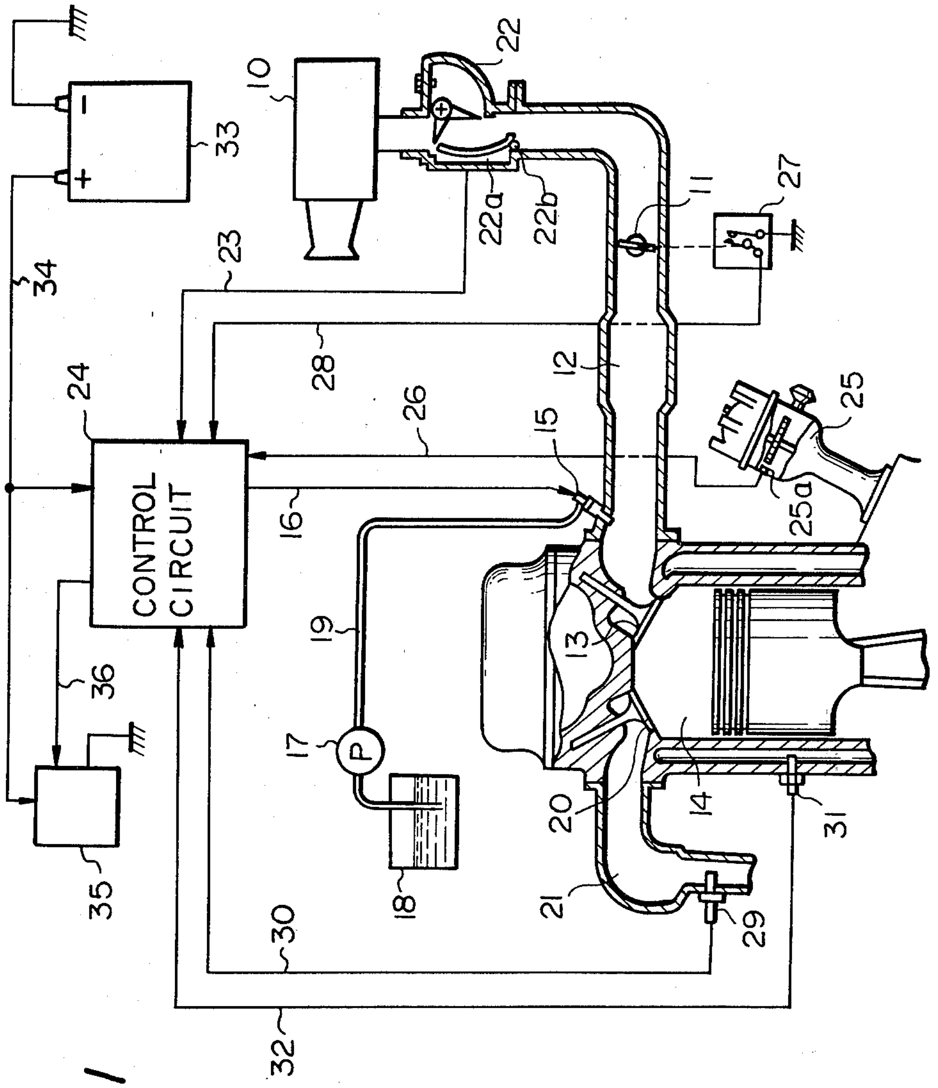
FIG. 1 is a schematic diagram illustrating an internal combustion engine having an electronic control fuel injection system, in which engine the method and apparatus of the present invention is used.

Referring to FIG. 1, the flow rate of air sucked into the engine via an air cleaner 10 is controlled by a throttle valve 11 which is interlocked to the accelerator pedal that is not illustrated. The air is then introduced into a combustion chamber 14 via a surge tank 12 and an intake valve 13. A fuel injection valve 15 is installed in the intake passage in the vicinity of the intake valve 13, and is opened and closed to inject the compressed fuel responsive to electric input pulse signals that are introduced through a line 16. A fuel pump 17 pressurizes the fuel in a fuel tank 18 and sends the fuel to the fuel-injection valve 15 via a conduit 9. The exhaust gas burned in the combustion chamber 14 is emitted through an exhaust valve 20, an exhaust manifold 21, and a catalytic converter which is not illustrated.

An air flow sensor 22 is provided in the intake passage between the air cleaner 10 and the throttle valve 11. The air flow sensor 22 detects the flow rate of the intake air, and sends an output signal indicative of the detected flow rate to a control circuit 24 via a line 23. A crank angle sensor **25*a* provided in a distributor 25 produces two kinds of pulse signals every time the crank shaft of the engine has rotated by a predetermined angle, for example, every crank angle of 30° and 360°, respectively. The produced pulsed signals are sent to the control circuit 24 through a line 26**.

An idle switch 27 interlocked to the throttle valve 11 sends a signal to the control circuit 24 through a line 28, when the throttle valve 11 is in the idling position.

An exhaust gas sensor 29 installed in the exhaust manifold 21 detects whether the air-fuel ratio of the mixture intaken by the combustion chamber 14 is on the rich side or the lean side relative to a stoichiometric air-fuel ratio, relying upon the concentration of a predetermined component in the exhaust gas, for example, relying upon the oxygen concentration in the exhaust gas, and sends an output signal to the control circuit 24 via a line 30. Hereinafter, the exhaust gas sensor 29 is called the $O_2$ sensor.

The output signal of a coolant temperature sensor 31 which detects the temperature of the coolant in the engine is fed to the control circuit 24 through a line 32. A battery 33 applies a power voltage to the control circuit 24 via a line 34.

The control circuit 24 sends, via a line 36, an output signal to an indicator mechanism 35 which consists of a light emitting diode, an incandescent lamp, or other indicating element.

Figures 2, 2A, 2B:
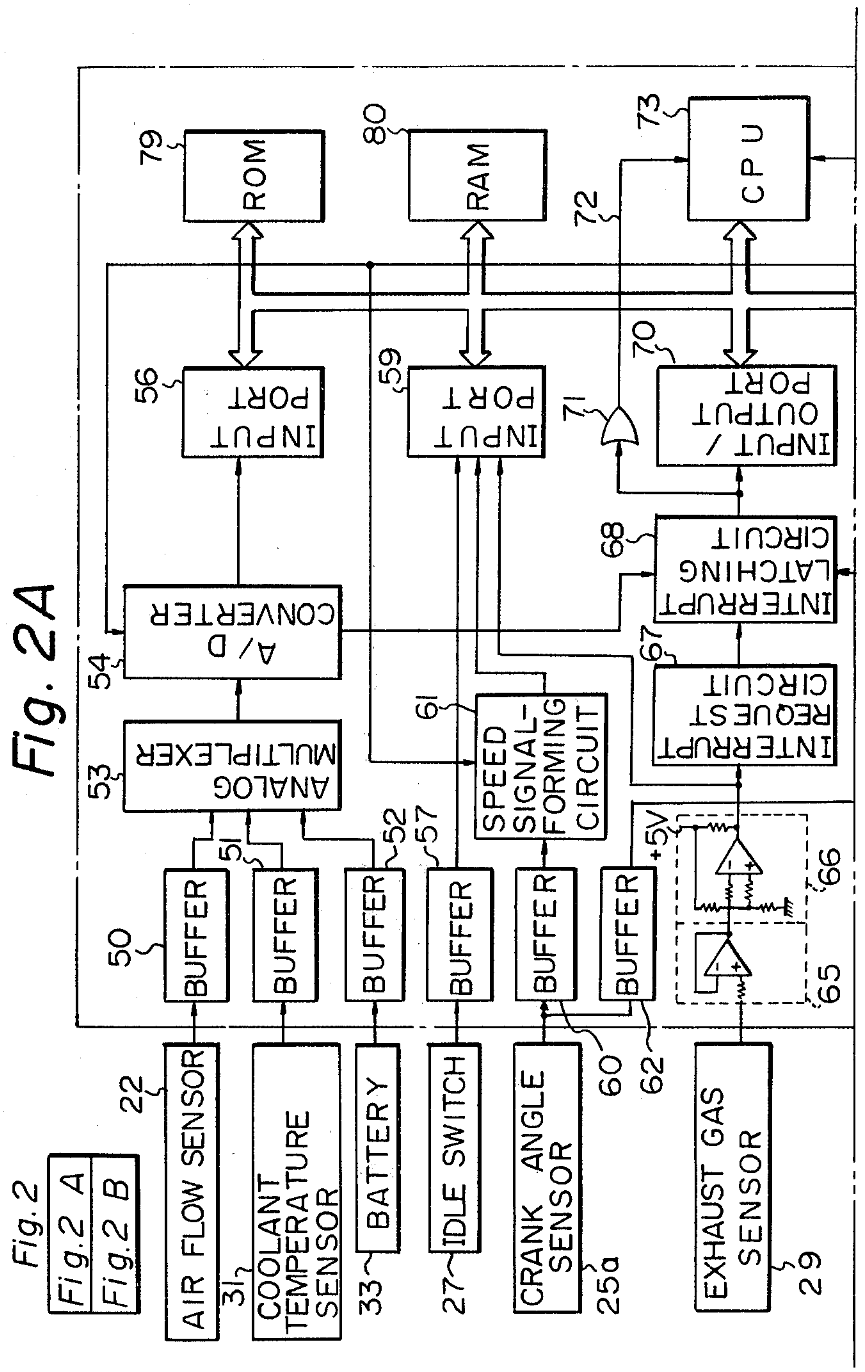
FIGS. 2A and 2B together are a block diagram illustrating a control circuit shown in FIG. 1.
Figure 2B:
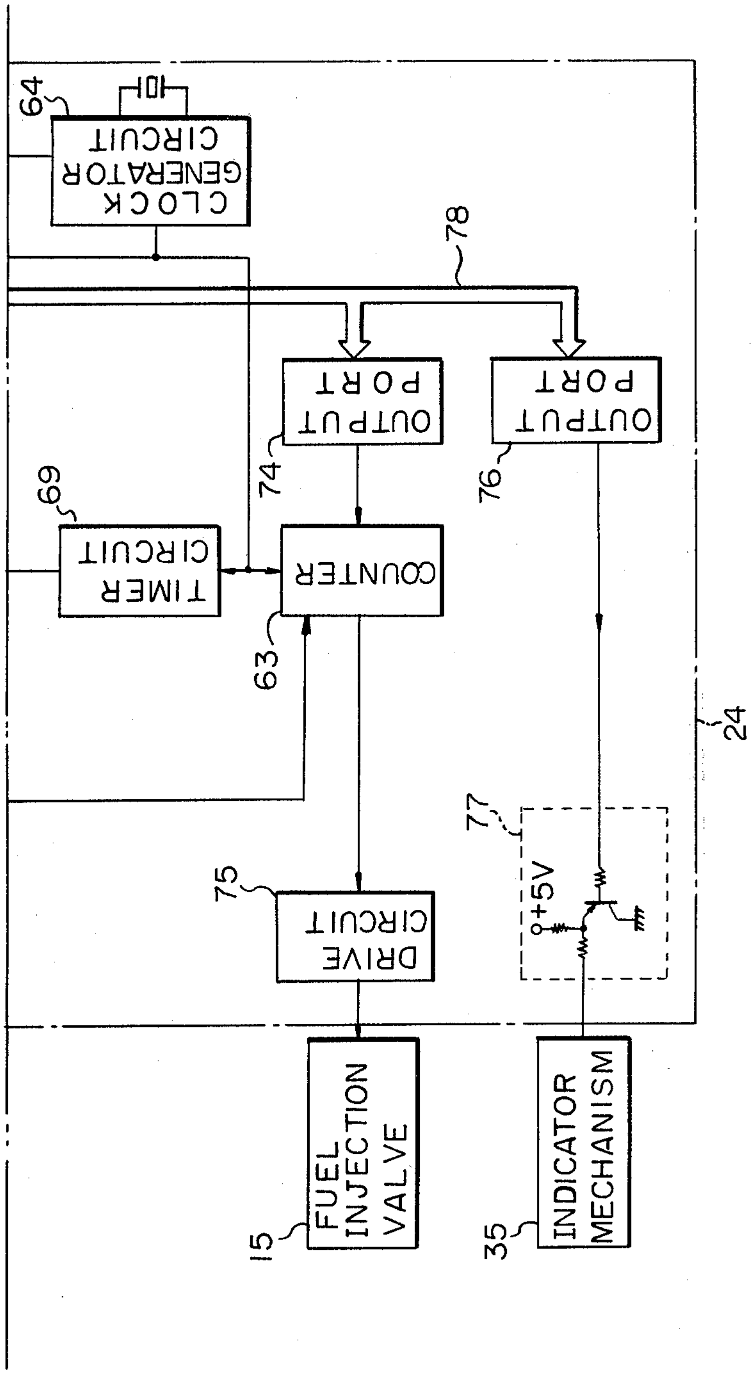

FIG. 2 is a block diagram illustrating an embodiment of the control circuit 24 of FIG. 1. In this embodiment, the control circuit 24 is equipped with a microcomputer to control a variety of operations of the engine. In FIG. 2, the air flow sensor 22, coolant temperature sensor 31, battery 33, idle switch 27, $O_2$ sensor 29, fuel injection valve 15 and indicator mechanism 35 shown in FIG. 1 are indicated by blocks.

Output signals of the air flow sensor 22, the coolant temperature sensor 31 and the battery 33 are fed to an analog multiplexer 53 via buffers 50, 51 and 52 each consisting of a low-pass filter and an amplifier. One signal is selected from among these signals and is sent to an analog-to-digital converter (A/D converter) 54. A signal which is converted into the form of a binary number by the A/D converter 54 is sent to an input port 56 and is stored therein.

A signal which is produced by the idle switch 27 and which indicates whether the throttle valve 11 is in the idling position or not, is fed to an input port 59 via a buffer 57 which consists of a low-pass filter and a switching transistor, and is stored in the input port 59. Pulses produced by the crank angle sensor 25*a* at every crank angle of 30° are fed to a speed signal-forming circuit 61 via a buffer 60 which is constructed in the same manner as the buffer 57, and pulses produced at every crank angle of 360° are fed to a counter 63 via a buffer 62 which is constructed in the same manner as the buffer 57. The speed signal-forming circuit 61 has a gate that is opened and closed by the crank-angle pulses and a counter which counts the number of clock pulses that are fed from a clock generator circuit 64 to the counter through the gate. The speed signal-forming circuit 61 generates a speed signal in the form of a binary number, which signal corresponds to the rotational speed of the engine. The binary speed signal is fed to an input port 59 and is stored therein.

The signal from the exhaust gas sensor 29 is fed to a comparator circuit 66 via a voltage follower circuit 65 for matching the impedance, to be compared with a reference voltage. Then, a rich or lean air-fuel ratio signal $O_x$ having the logic level of "1" of "0" is formed. The air-fuel ratio signal is sent to the input port 59 and is stored therein. Further, an interrupt signal is required at an inversion point between the rich air-fuel ratio signal and the lean air-fuel ratio signal. For this purpose, an inversion-point signal is formed by an interrupt request circuit 67. This inversion-point signal is sent to an interrupt latching circuit 68.

The interrupt latching circuit 68 receives a signal indicative of the completion of the A/D conversion from the A/D converter 54 and a signal produced by a timer circuit 69 after every predetermined period of time. The output of the interrupt latching circuit 68 is fed to an input/output port 70 as well as to an OR circuit 71. The output of the OR circuit 71 is fed to a central processing unit (CPU) 73 via an interrupt request line 72. Upon receipt of an interrupt request via the interrupt request line 72, the CPU 73 discriminates the kind of interrupt request via the input/output port 70.

An output signal which corresponds to one injection period $\tau$ of the fuel injection valve 15 is fed from the CPU 73 to an output port 74, and the value of the output signal is set to the counter 63 at a predetermined timing. The counter 63 is a presettable down counter which produces an output of the logic level of "1" upon receipt of a pulse which is produced by the crank angle sensor 25*a* at every crank angle of 360°. The down counter 63 subtracts the contents one by one upon each reception of a clock pulse from the clock generator circuit 64, and inverts the output thereof into the logic level of "0" when the content reaches zero. Thus, the output of the counter 63 serves as an injection signal having a pulse width that is equal to the injection period $\tau$, and is sent to the fuel injection valve 15 via a drive circuit 75.

An indication signal consisting of one bit is fed to an output port 76. When the signal is of the logic level of "1", an indicator mechanism 35 is energized via a drive circuit 77. The indicator mechanism 35 is deenergized when the signal has the logic level of "0".

The input ports 56 and 59, the input/output port 70, and the output ports 74 and 76 are connected via a bus 78 to the above-mentioned CPU 73, read-only memory (ROM) 79 and random access memory (RAM) 80, which are constituent elements of a microcomputer. Although not illustrated in FIG. 2, the microcomputer is further equipped with an input/output control circuit, a memory control circuit, and the like in a customary manner. The ROM 79 stores a program for calculating the fuel injection period, interrupt processing programs for correcting the air-fuel ratio and for informing the operating conditions as contemplated by the present invention, as well as various data necessary for performing the arithmetic calculations, as will be mentioned later.

Figure 3:
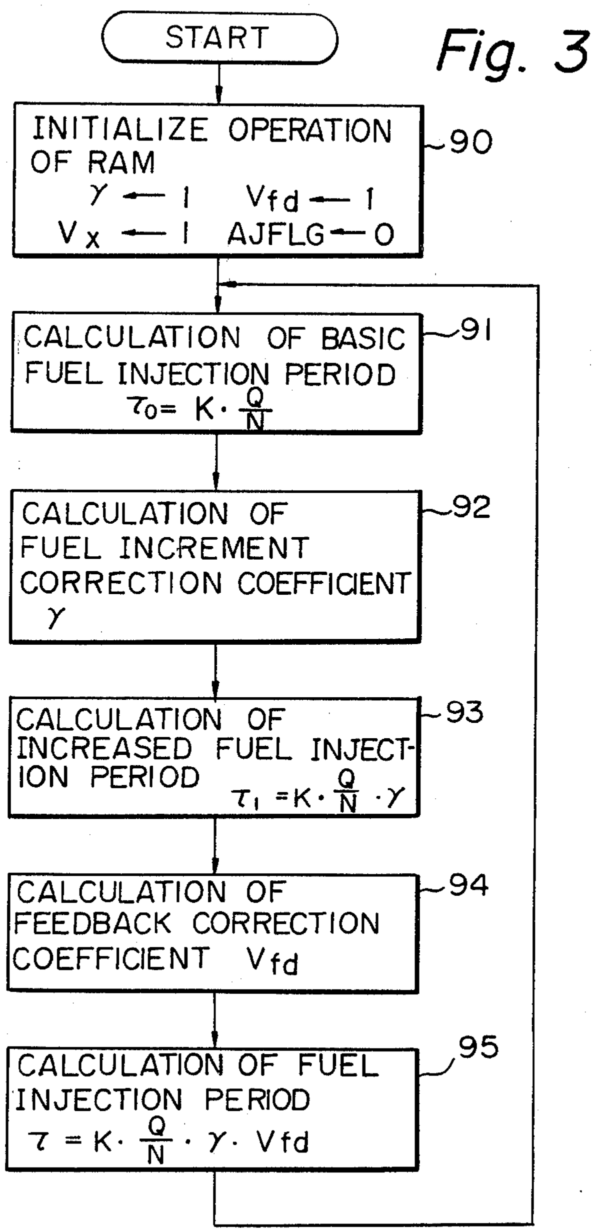
FIGS. 3, 4, 5 and 6 are flow diagrams illustrating the operations of the microcomputer in the control circuit of FIG. 2.

The contents to be processed by the microcomputer and the operation of the embodiment will be explained below with reference to flow diagrams of FIGS. 3 to 6. FIG. 3 illustrates a part of a main routine for calculating the fuel injection period. When the control circuit 24 is conducted to the power supply, an initial value is loaded to the RAM 80 at a point 90. Namely, a fuel increment correction coefficient $\gamma$ which is determined by the coolant temperature, battery voltage and other detection signals is reset to "1", an air-fuel ratio feedback correction coefficient $V_{fd}$ is reset to "1", an average value $V_x$ of feedback correction coefficients is reset to "1", and a feedback operation check flag AJFLG which consists of two bits is reset to "0". At a point 91, the CPU 73 calculates the basic injection period $\tau_0$ according to the relation $\tau_0 = K \cdot Q/N$, where Q denotes the flow rate of the intake air, N denotes the rotational speed of the engine and K is a constant. Then, at a point 92, the CPU 73 calculates a fuel increment correction coefficient $\gamma$ which is determined depending upon the coolant temperature and/or battery voltage. In some cases, the coefficient $\gamma$ may be determined, further, depending upon the temperature of the intake air and/or the atmospheric pressure. As for the coolant temperature, for example, the fuel increment correction coefficient $\gamma$ is calculated so that the fuel injection period is increased while the coolant temperature is low during the warming-up operation. As for the battery voltage, on the other hand, since the ineffective injection period of the fuel injection valve is increased with a decrease in the voltage, the fuel increment correction coefficient $\gamma$ is calculated so as to increase the fuel injection period in order to compensate for the decrease in the ineffective period. Then, at a point 93, the CPU 73 performs the operation to multiply the basic injection period $\tau_0$ by the fuel increment correction coefficient $\gamma$ to obtain an increased injection period $\tau_1 = \tau_0 \cdot \gamma$. At the next point 94, the CPU 73 performs an integration operation to increase or decrease the feedback correction coefficient $V_{fd}$ after every predetermined period of time, responsive to the air-fuel ratio signal $O_x$ from the $O_2$ sensor 29, i.e., responsive to a rich air-fuel signal or a lean air-fuel signal. When the $O_2$ sensor 29 is not properly functioning, the air-fuel ratio is controlled by an open loop with $V_{fd}=1$. Then, at a point 95, the injection period $\tau_1$ is multiplied by the feedback correction coefficient $V_{fd}$, and the data which corresponds to the below-mentioned fuel injection period $\tau$ is fed to the output port 74.

$$\tau=\tau_1\cdot V_{fd}=K\cdot(Q/N)\cdot\gamma\cdot V_{fd}$$

When the operation at the point 95 is finished, the program returns again to the point 91, and the same processing is repeated again. The above-mentioned arithmetic calculation has been widely known, and its details are not provided here.

Figure 4:
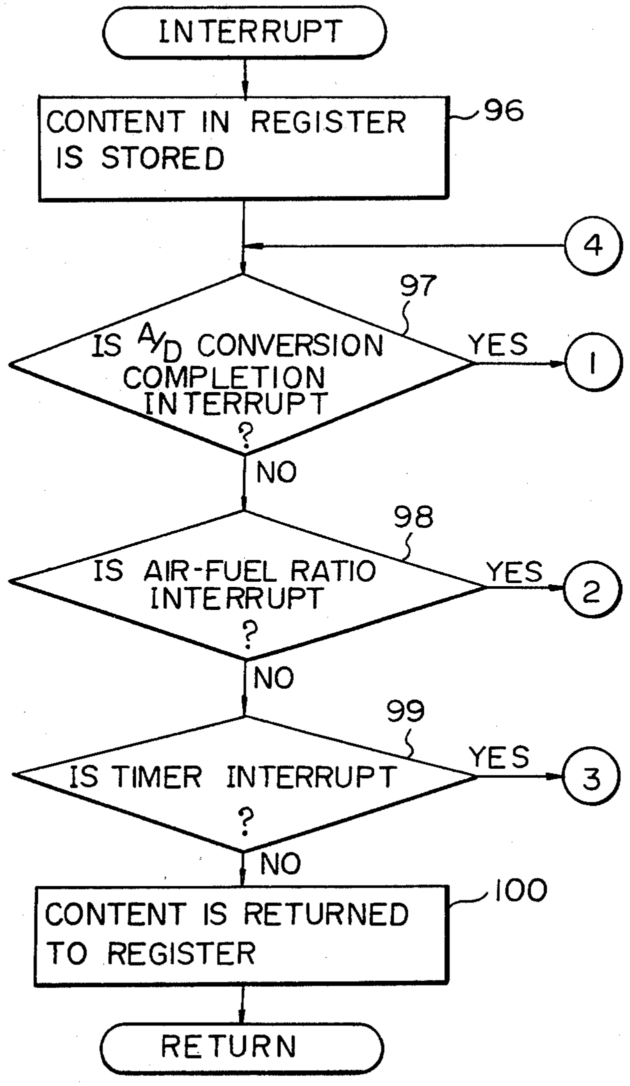
Figure 5:
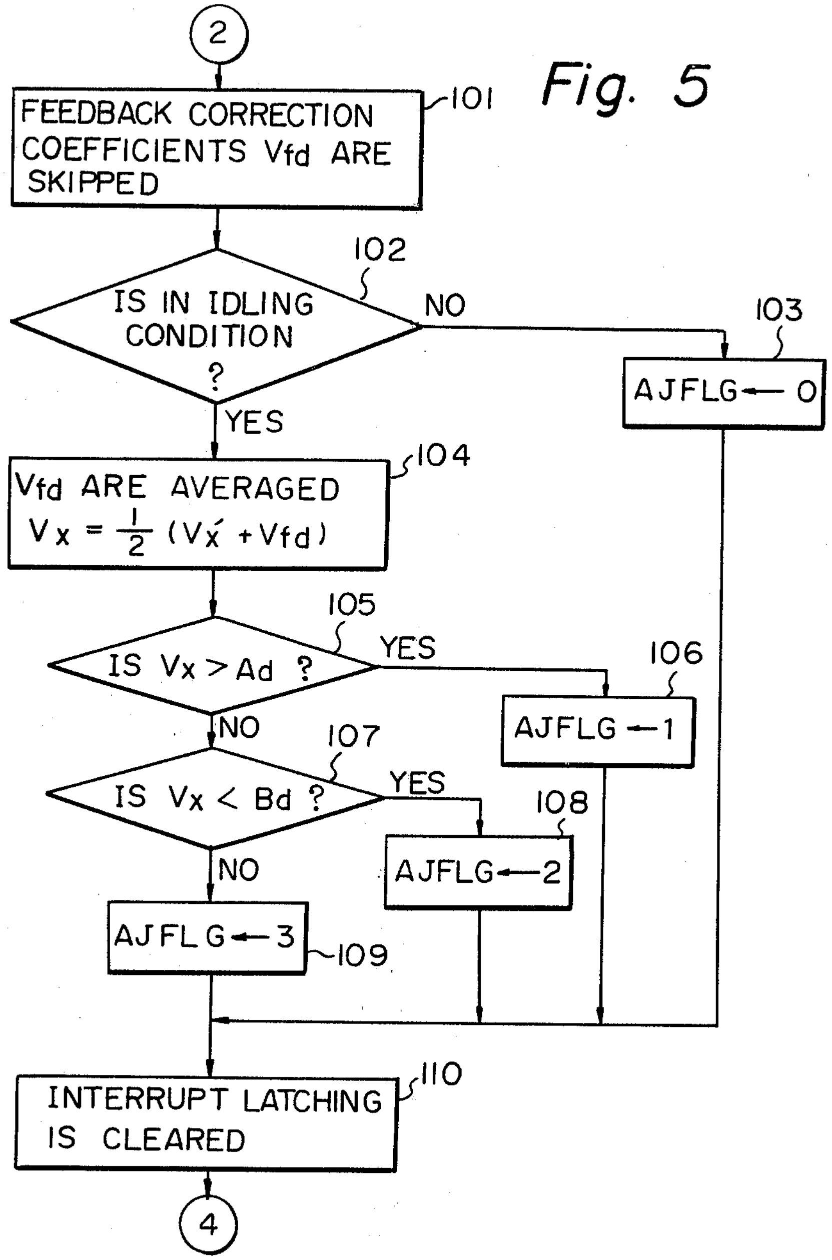
Figure 6:
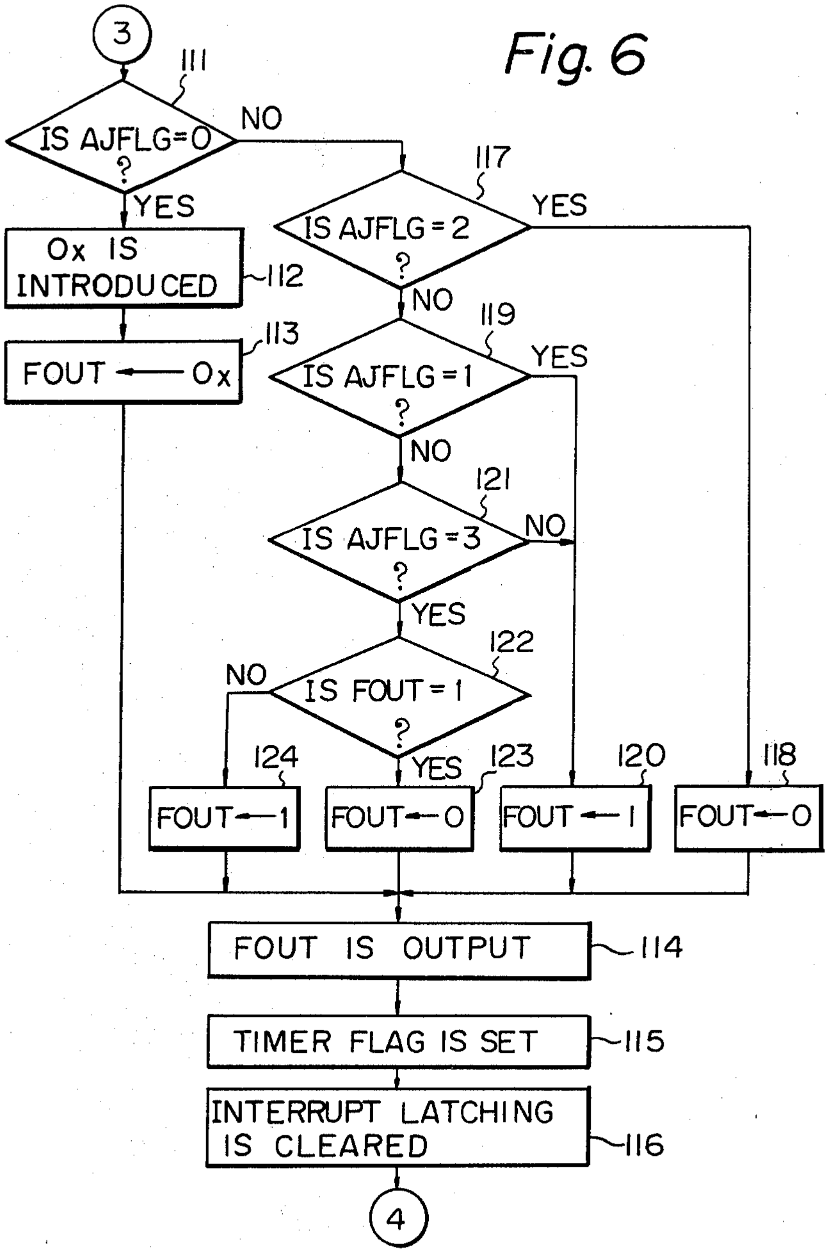

When an interrupt request signal is applied via the interrupt latching circuit 68, the CPU 73 executes the interrupt processing routines which are shown in FIGS. 4 to 6. Namely, as the interrupt request signal is applied, the CPU 73 stores the content of the program counter which is now being executed in the RAM 80, and changes the content of the program counter to a value which corresponds to the program adress of a point 96 of FIG. 4. Thus, the processing of the point 96 is carried out. At the point 96, the content of the general-purpose register is temporarily stored in the RAM 80, so that the content of the register is not lost. At a point 97, then, the CPU 73 discriminates whether the interrupt request is produced by the completion of the conversion of the A/D converter 54 or not. If the interrupt request is produced by the completion of the A/D conversion, the program is branched to an A/D conversion completion processing routine ①. As the A/D conversion completion processing routine has no relation to the present invention, it is not explained here. When it is discriminated that the interrupt request is not effected by the completion of the A/D conversion, the program proceeds to a point 98 where the CPU 73 discriminates whether it is an air-fuel ratio interrupt, i.e., whether it is an interrupt by an inversion-point signal produced at an inversion point between the rich signal and the lean signal of the air-fuel ratio signal $O_x$. When the interrupt request is an air-fuel ratio interrupt, the program is branched to a point ② of the air-fuel ratio interrupt processing routine illustrated in FIG. 5. Otherwise, the program proceeds to a next point 99 where it is discriminated whether or not the interrupt request is a timer interrupt request produced at every predetermined period of time. When it is a timer interrupt request, the program proceeds to a point ③ of the timer interrupt processing routine illustrated in FIG. 6. When the processing is finished, each of the interrupt processing routines returns again to the point ④ where it is discriminated whether other interrupt processing routines should be executed or not. When all of the requested interrupt processing routines are completed, the program proceeds to a point 100 where the content of the general-purpose register and the content of the program counter are returned from the RAM 80, and the main routine is resumed.

The air-fuel ratio interrupt processing routine is illustrated below with reference to FIG. 5. First, at a point 101, the CPU 73 discriminates whether the air-fuel ratio signal $O_x$ from the $O_2$ sensor 29 via the input port 59 is inverted from the rich signal to the lean signal or vice versa, and performs a so-called skip processing to rapidly increase or decrease the feedback correction coefficient $V_{fd}$ at the point of inversion. At a point 102, then, the CPU 73 discriminates whether the engine is in the idling condition or not depending upon a signal from the idle switch 27. When the idle switch 27 has detected that the engine is not in the idling condition or the throttle valve 11 is not in the idling position, the program proceeds to a point 103 where the feedback operation check flag AJFLG is set to "0" ("00" in a binary code).

When the engine is in the idling condition, the program proceeds to a point 104 where the feedback correction coefficients $V_{fd}$ are averaged to find an average value $V_x$. The average value $V_x$ is calculated according to the following relation using an average value $V_x'$ which was found in the previous processing and which has been stored in the RAM 80.

$$V_x=\tfrac{1}{2}(V_x'+V_{fd})$$

The average value $V_x$ is compared at a point 105 with an upper reference value $A_d$ corresponding to the largest value of a predetermined range. When $V_x$ is greater than $A_d$, the program proceeds to a point 106 where AJFLG is set to "1" ("01" in a binary code). When $V_x \leqq A_d$, the program proceeds to a point 107 where the average value $V_x$ is compared with a lower reference value $B_d$ corresponding to the smallest value of the predetermined range. When $V_x<B_d$, the program proceeds to a point 108 where AJFLG is set to "2" ("10" in a binary code). When $V_x \geqq B_d$, the program proceeds to a point 109 where AJFLG is set to "3" ("11" in a binary code). Owing to the above-mentioned routine processing, a predetermined numeral is stored in AJFLG depending upon the magnitude of the average value $V_x$ of feedback correction coefficients relative to the upper and lower reference values $A_d$ and $B_d$. Then, the air-fuel ratio interrupt request signal stored in the interrupt latching circuit 68 is cleared at a point 110, and the program returns to the point ④ of FIG. 4.

In the interrupt processing routine of FIG. 5, the average value $V_x$ of the feedback correction coefficients $V_{fd}$ is compared with the upper and lower reference values $A_d$ and $B_d$. The feedback correction coefficients $V_{fd}$, however, may be directly compared with the upper and lower reference values $A_d'$ and $B_d'$.

Below is illustrated the timer interrupt processing routine with reference to FIG. 6. When a timer interrupt request is produced after every predetermined time interval, for example, every 50 milliseconds, and is detected at the point 99 of FIG. 4, the CPU 73 executes the processing at a point 111 of FIG. 6, i.e., discriminates whether AJFLG is "0" or not. When AJFLG=0, the program proceeds to a point 112 where an air-fuel ratio signal $O_x$ is introduced from the $O_2$ sensor 29 via the input port 59. Then, FOUT$=O_x$ is formed at a point 113, and the program proceeds to a point 114 where FOUT is output to the output port 76. Then, at a point 115, the CPU 73 performs a processing such as to set a timer flag which is used for integrating the feedback correction coefficients $V_{fd}$ at the point 94 of the main routine of FIG. 3. Thereafter, at a point 116, the CPU 73 clears predetermined bits of the interrupt latching circuit 68. The program then proceeds to the point ④ of FIG. 4. Thus, when AJFLG=0, the air-fuel ratio signal $O_x$ is fed to the output port 76. When AJFLG is not "0", the program proceeds to a point 117 where it is discriminated whether AJFLG is "2" or not. When AJFLG=2, FOUT=0 is formed at a point 118, and then the program proceeds to a point 114 where FOUT is fed to the output port 76. Namely, when AJFLG=2, a signal having the logic level of "0" is continuously fed to the output port 76. When it is discriminated at the point 117 that AJFLG is not "2", the program proceeds to a point 119 where it is discriminated whether AJFLG is "1" or not. When AJFLG=1, the program proceeds to a point 120 where FOUT=1 is formed, and then FOUT is fed to the output port 76 at the point 114. Namely, when AJFLG=1, a signal having the logic level of "1" is continuously fed to the output port 76. When it is discriminated at a point 119 that AJFLG is not "1", the program proceeds to a point 121 where it is discriminated whether AJFLG is "3" or not. When AJFLG=3, the program proceeds to a point 122 where it is discriminated whether FOUT in the previous operation cycle is "1" or not. When the previous FOUT=1, the program proceeds to a point 123 where FOUT is set to "0". When the previous FOUT=0, the program proceeds to a point 124 where FOUT is set to "1". Namely, the steps at the points 122 to 124 work to alternatingly invert the logic level of FOUT to "1" and "0" in every operation cycle, and the obtained FOUT is fed to the output port 76 at the point 114. When AJFLG=3, therefore, signals having the logic level alternatingly inverted between "1" and "0" responsive to the timer interrupt signals are produced or, in other words, signals having a duty cycle of $\frac{1}{2}$ with respect to the logic level of "1" are output.

When a signal of the logic level of "1" is sent to the output port 76, the indicator mechanism 35 is energized via the drive circuit 77, and, for example, a light-emitting diode is turned on. Further, as a signal of the logic level of "0" is fed to the output port 76, the light-emitting diode is turned off. Therefore, when the idle switch 27 is turned off, i.e., when the engine is in the operating condition, which is different from the idling condition, the light-emitting diode flashes in response to the change of the air-fuel ratio signals $O_x$ produced from the $O_2$ sensor 29. When the idle switch 27 is turned on, i.e., when the engine is in the idlingg condition, the burning mode of the light-emitting diode varies depending upon the magnitude of the feedback correction coefficient $V_{fd}$ relative to the upper and lower reference values $A_d'$ and $B_d'$, or depending upon the magnitude of an average value $V_x$ of feedback correction coefficients $V_{fd}$ relative to the upper and lower reference values $A_d$ and $B_d$. When $V_x > A_d$ or $V_{fd} > A_d'$, the light-emitting diode turns on continuously. When $V_x < B_d$ or $V_{fd}$21 $B_d'$, the light-emitting diode remains turned off. When $B_d \leqq V_x \leqq A_d$ or $B_d' \leqq V_{fd} \leqq A_d'$, the light-emitting diode flashes maintaining a duty cycle of $\frac{1}{2}$.

Figure 7:
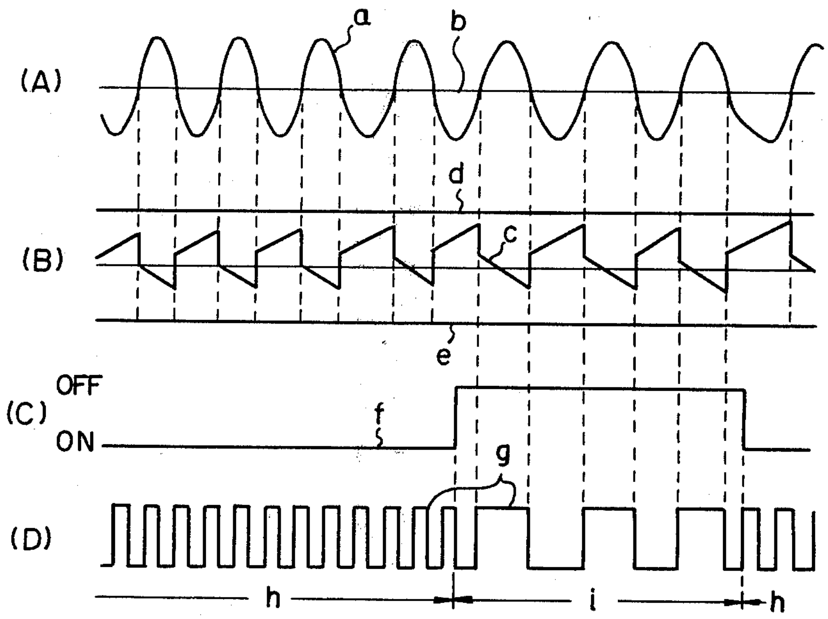
FIG. 7 contains wave forms (A), (B), (C) and (D) for illustrating the effects of the operations according to the programs shown in FIGS. 3 to 6.

FIG. 7 illustrates signals obtained by the aforementioned arithmetic calculation, in which symbol a in the diagram (A) denotes output signals of the $O_2$ sensor 29, and symbol b denotes a reference voltage of the comparator circuit 66. Further, symbol c in the diagram (B) denotes a value of feedback correction coefficient $V_{fd}$, and symbols d and e denote upper and lower reference values $A_d'$ and $B_d'$, respectively. Symbol f in the diagram (C) denotes a signal from the idle switch 27, and symbol g in the diagram (D) denotes signals which are fed to the output port 76. During the period h in which the idle switch 27 is turned on, as will be obvious from FIG. 7, the feedback operation check signal is displayed and during the period i in which the idle switch 27 is turned off, the air-fuel ratio signals from the $O_2$ sensor 29 are displayed. In FIG. 7, the feedback operation check signal represents the state in which the air-fuel ratio state of the engine is maintained as $B_d \leqq V_x \leqq A_d$ or $B_d' \leqq V_{fd} \leqq A_d'$.

To tune up the air-fuel ratio feedback control system, the throttle valve 11 is set to the idling position to produce the feedback operation check signal. When the light-emitting diode turns on continuously, an idle adjusting screw **22*b* is turned so that the flow rate of the ar through a bypass passage 22*a* of the air flow sensor 22 is reduced. When the light-emitting diode remains turned off, the screw 22*b*** is turned so that the flow rate of the bypass air is increased. Finally, the light-emitting diode should flash at a duty cycle of $\frac{1}{2}$ as indicated in the period h of g of FIG. 7(D).

When the response of the $O_2$ sensor 29 is to be checked, the throttle valve 11 is opened to provide a signal which is synchronized with the air-fuel ratio signals $O_x$. Then, it is checked whether the light-emitting diode flashes at a frequency of higher than 0.8 Hz at an engine speed of, for example, 2500 rpm. The response performance is good when the light-emitting diode flashes at a frequency of greater than 0.8 Hz.

Figure 8:
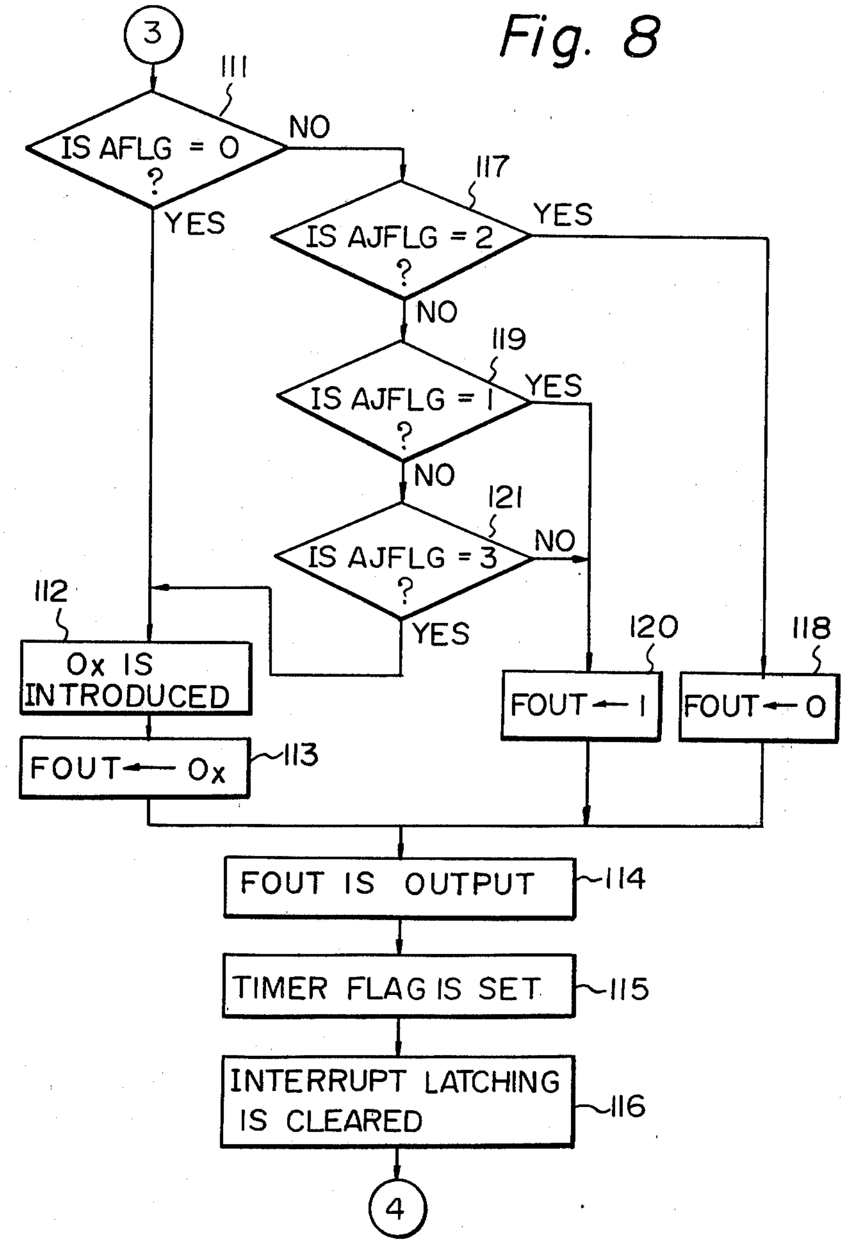
FIG. 8 is a flow diagram illustrating another example of the program shown in FIG. 6.

FIG. 8 illustrates a modified embodiment of the timer interrupt processing routine of FIG. 6. According to this processing routine, when it is discriminated at a point 121 that AJFLG=3, the program is branched to a point 112. Therefore, when $B_d \leqq V_x \leqq A_d$ or $B_d' \leqq V_{fd} \leqq A_d'$, a signal which is synchronized with the air-fuel ratio signal $O_x$, is fed to the output port 76 instead of a signal having a $\frac{1}{2}$ duty cycle, and is indicated on the indicator mechanism 35. According to this processing routine, therefore, the output of the $O_2$ sensor 29 can be checked even in the idling condition. Other contents to be processed in the processing routine of FIG. 8 are quite the same as those of FIG. 6.

In the above-mentioned embodiments, the feedback operation check signal is indicated when the engine is in the idling condition, and air-fuel ratio signals are also indicated on the same indicating mechanism during other operation conditions in synchronism with the outputs of the $O_2$ sensor. During the idling condition, however, it is also possible to indicate diagnosed signals which indicate the detected abnormal operations of the engine instead of indicating the feedback operation check signals.

According to the present invention as illustrated in detail in the foregoing, different signals are fed to the same output terminal and are indicated depending upon whether the throttle valve is at the idling position or not. Therefore, it is possible to recognize different signals, i.e., to recognize the feedback operation check signals or the diagnosis signals and the signals for checking response performance of the exhaust gas sensor, without the need of increasing the number of output terminals. According to the present invention, therefore, it is possible to reduce the manufacturing cost and to simplify the circuit construction.

As many widely different embodiments of the present invention may be constructed without departing from the spirit and scope of the present invention, it should be understood that the present invention is not limited to the specific embodiments described in this specification, except as defined in the appended claims.

We claim:

1. A method of communicating the operating conditions of an internal combustion engine havng a throttle valve, an information output terminal, an exhaust gas sensor for detecting the concentration of a predetermined component in the exhaust gas and producing an output signal which alternates in response to the change of the detected concentration, and a feedback control system for producing, depending upon the output signal from the exhaust gas sensor, a loop feedback signal and for correcting the air-fuel ratio of the air-fuel mixture supplied to the engine depending upon the produced loop feedback signal, said method comprising the steps of:

detecting whether the throttle valve is in the idling position and producing an idling detection signal which indicates whether the throttle valve is in the idling position;

in response to the idling detection signal, discriminating whether the loop feedback signal is within a predetermined range and supplying an electrical signal which indicates whether the loop feedback signal is within the predetermined range, to said information output terminal, only when the throttle valve is in the idling position; and in response to the idling detection signal, supplying an electrical signal which is synchronized with the output signal from the exhaust gas sensor to said information output terminal, when the throttle valve is not in the idling position.

2. A method as claimed in claim 1, wherein said discriminating step includes the steps of:

discriminating whether the loop feedback signal is larger than the largest value of said predetermined range and producing a first electrical signal when the loop feedback signal is larger than said largest value;

discriminating whether the loop feedback signal is smaller than the smallest value of said predetermined range and producing a second electrical signal when the loop feedback signal is smaller than the smallest value; and discriminating whether the loop feedback signal is within said predetermined range and producing a third electrical signal when the loop feedback signal is within said predetermined range, one of said first, second and third electrical signals being fed to said information output terminal, only when the throttle valve is in the idling position.

3. A method as claimed in claim 2, wherein said first electrical signal is a signal having a predetermined logic level, said second electrical signal is a signal having the inverted logic level of the first electrical signal, and said third electrical signal is a signal having an alternating logic level.

4. A method as claimed in claim 3, wherein said third electrical signal alternates at a predetermined interval.

5. A method as claimed in claim 3, wherein said third electrical signal alternates in synchronism with the output signal from the exhaust gas sensor.

6. A method as claimed in claim 1, wherein said discriminating step includes a step of calculating the average value of the loop feedback signal, said discrimination being performed by discriminating whether the calculated average value is within a predetermined range and supplying to said information output terminal an electrical signal which indicates whether the calculated average value is within the predetermined range, only when the throttle valve is in the idling position.

7. A method of communicating the operating conditions of an internal combustion engine having a throttle valve, an information output terminal, an exhaust gas sensor for detecting the concentration of a predetermined component in the exhaust gas and producing an output signal which alternates in response to the change of the detected concentration, a feedback control system for controlling the air-fuel ratio of the air-fuel mixture supplied to the engine depending upon the output signal from the exhaust gas sensor, and a diagnosis system for detecting abnormal operations of the engine to produce diagnosed signals which indicate the detected abnormal operations, said method comprising the steps of:

detecting whether the throttle valve is in the idling position and producing an idling detection signal which indicates whether the throttle valve is in the idling position;

in response to the idling detection signal, feeding one of the diagnosed signals to said information output terminal, only when the throttle valve is in the idling position; and in response to the idling detection signal, feeding an electrical signal which is synchronized with the output signal from the exhaust gas sensor to said information output terminal, when the throttle valve is not in the idling position.

8. Apparatus for communicating the operating conditions of an internal combustion engine having a throttle valve, an information output terminal, an exhaust gas sensor for detecting the concentration of a predetermined component in the exhaust gas and producing an output signal which alternates in response to the change of the detected concentration, and a feedback control system for producing, depending upon the output signal from the exhaust gas sensor, a loop feedback signal and for correcting the air-fuel ratio of the air-fuel mixture supplied to the engine depending upon the produced loop feedback signal, said apparatus comprising:

means for detecting whether the throttle valve is in the idling position and producing an idling detection signal which indicates whether the throttle valve is in the idling position; and processing means responsive to said idling detection signal, for (1) discriminating whether the loop feedback signal is within a predetermined range and supplying an electrical signal which indicates whether the loop feedback signal is within the predetermined range, to said information output terminal, only when the throttle valve is in the idling position, and (2) feeding an electrical signal which is synchronized with the output signal from the exhaust gas sensor to said information output terminal, when the throttle valve is not in the idling position.

9. Apparatus as in claim 8, wherein said processing means performs said discriminating function by:

discriminating whether the loop feedback signal is larger than the largest value of said predetermined range and producing a first electrical signal when the loop feedback signal is larger than said largest value;

discriminating whether the loop feedback signal is smaller than the smallest value of said predetermined range and producing a second electrical signal when the loop feedback signal is smaller than said smallest value; and discriminating whether the loop feedback signal is within said predetermined range and producing a third electrical signal when the loop feedback signal is within said predetermined range, one of said first, second and third electrical signals being fed to said information output terminal, only when the throttle valve is in the idling position.

10. Apparatus as in claim 9, wherein said first electrical signal is a signal having a predetermined logic level, said second electrical signal is a signal having the inverted logic level of the first electrical signal, and said third electrical signal is a signal having an alternating logic level.

11. Apparatus as in claim 10, wherein said third electrical signal alternates at a predetermined interval.

12. Apparatus as in claim 10, wherein said third electrical signal alternates in synchronism with the output signal from the exhaust gas sensor.

13. Apparatus as in claim 8, wherein said processing means is also for determining the average value of the loop feedback signal, said processing means performing said discriminating function by discriminating whether the calculated average value is within a predetermined range only when the throttle valve is in the idling position.

14. Apparatus for communicating the operating conditions of an internal combustion engine having a throttle valve, an information output terminal, an exhaust gas sensor for detecting the concentration of a predetermined component in the exhaust gas and producing an output signal which alternates in response to the change of the detected concentration, a feedback control system for controlling the air-fuel ratio of the air-fuel mixture supplied to the engine depending upon the output signal from the exhaust gas sensor, and a diagnosis system for detecting abnormal operations of the engine to produce diagnosed signals which indicate the detected abnormal operations, said apparatus comprising:

means for detecting whether the throttle valve is in the idling position to produce an idling detection signal which indicates whether the throttle valve is in the idling position; and processing means, responsive to the idling detection signal, for (1) feeding one of the diagnosed signals to said information output terminal, only when the throttle valve is in the idling position, and (2) feeding an electrical signal which is synchronized with the output signal from the exhaust gas sensor, when the throttle valve is not in the idling position.

* * * * *